B. M. SHIPLEY.
CASH REGISTER.
APPLICATION FILED DEC. 19, 1919.
1,398,576.
Patented Nov. 29, 1921.
4 SHEETS—SHEET 4.
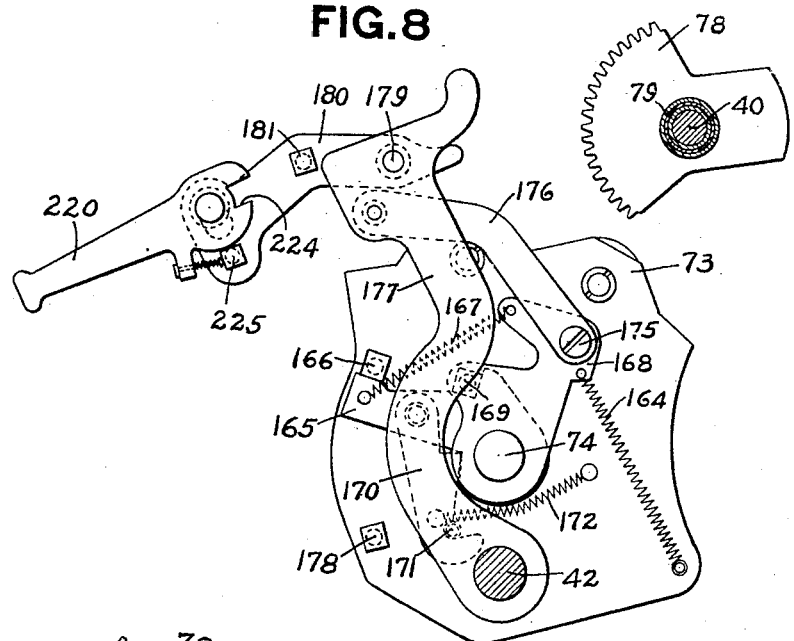
FIG. 8
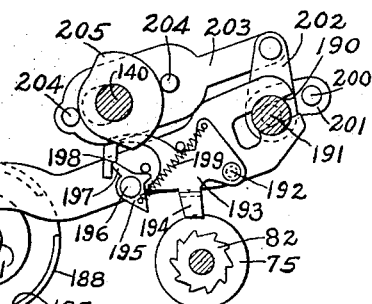
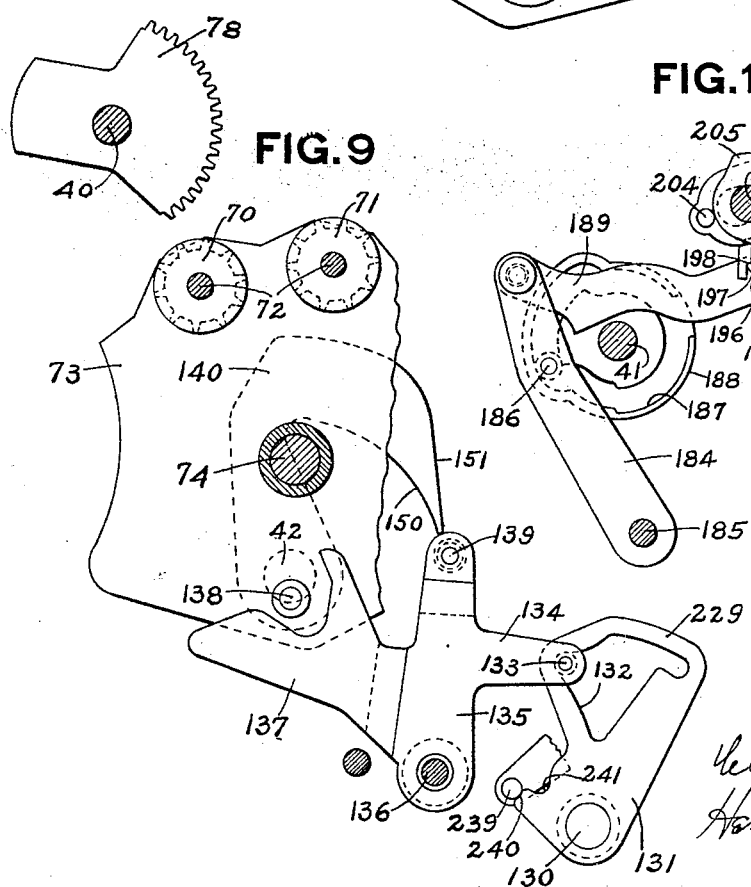
FIG. 9
FIG. 10
Inventor
BERNIS M. SHIPLEY
Attorney

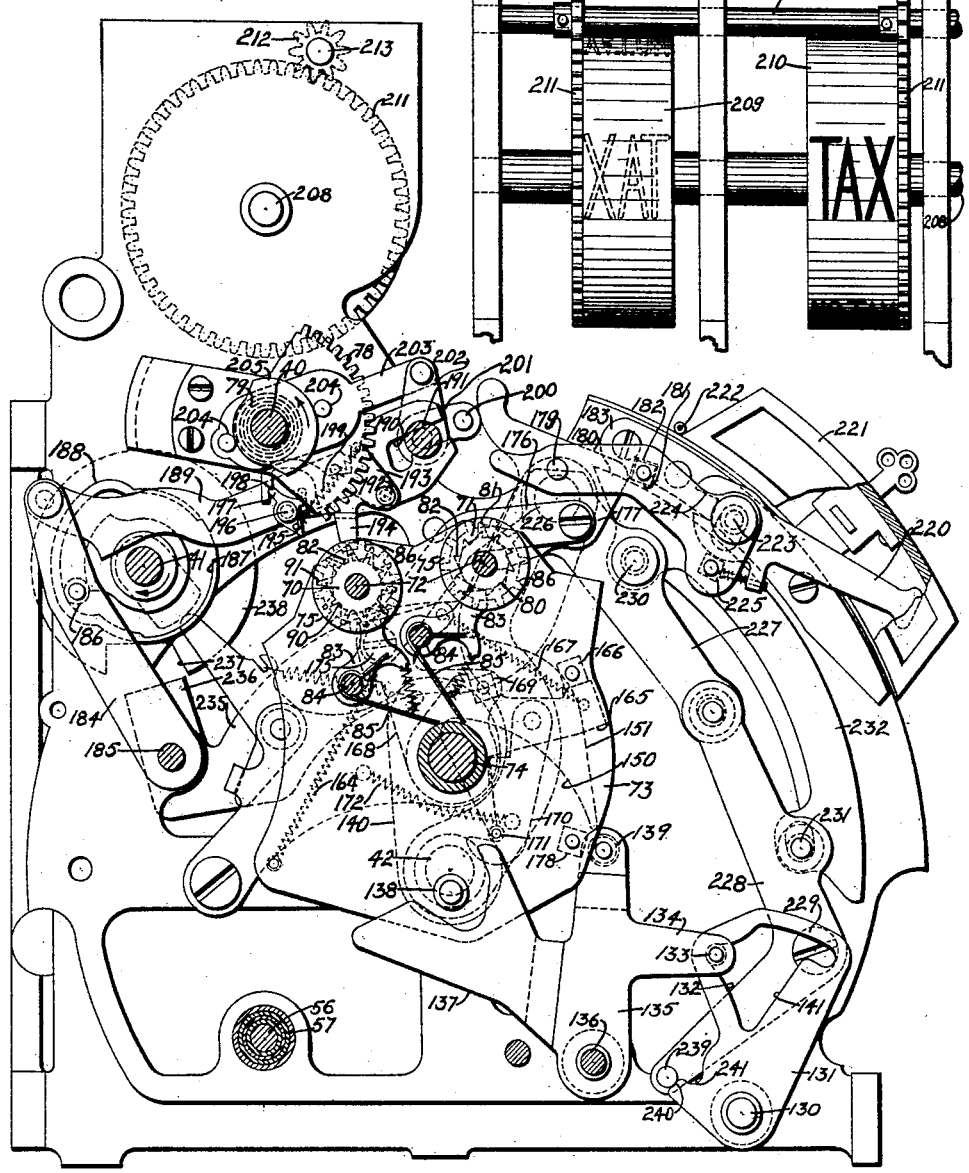

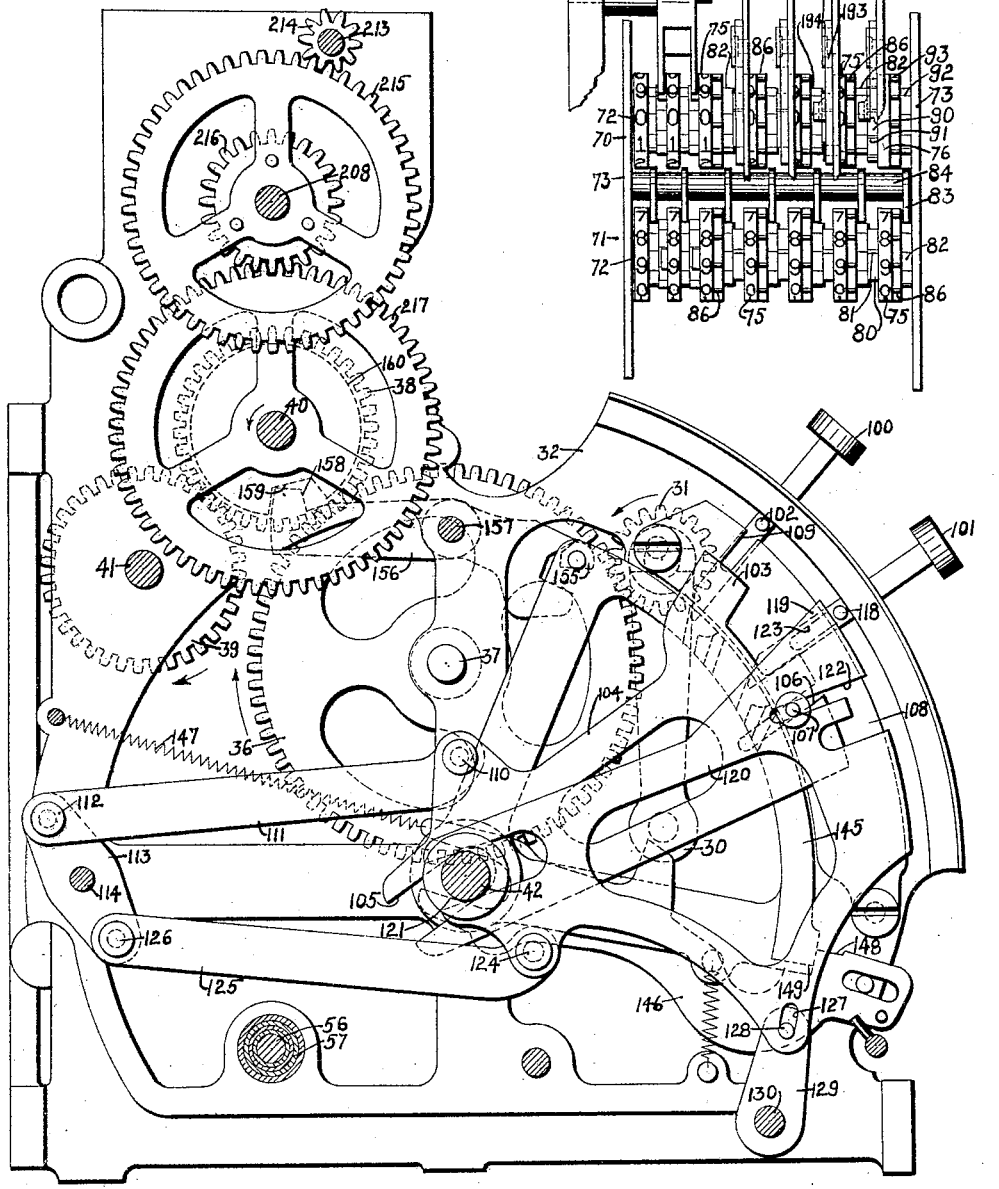

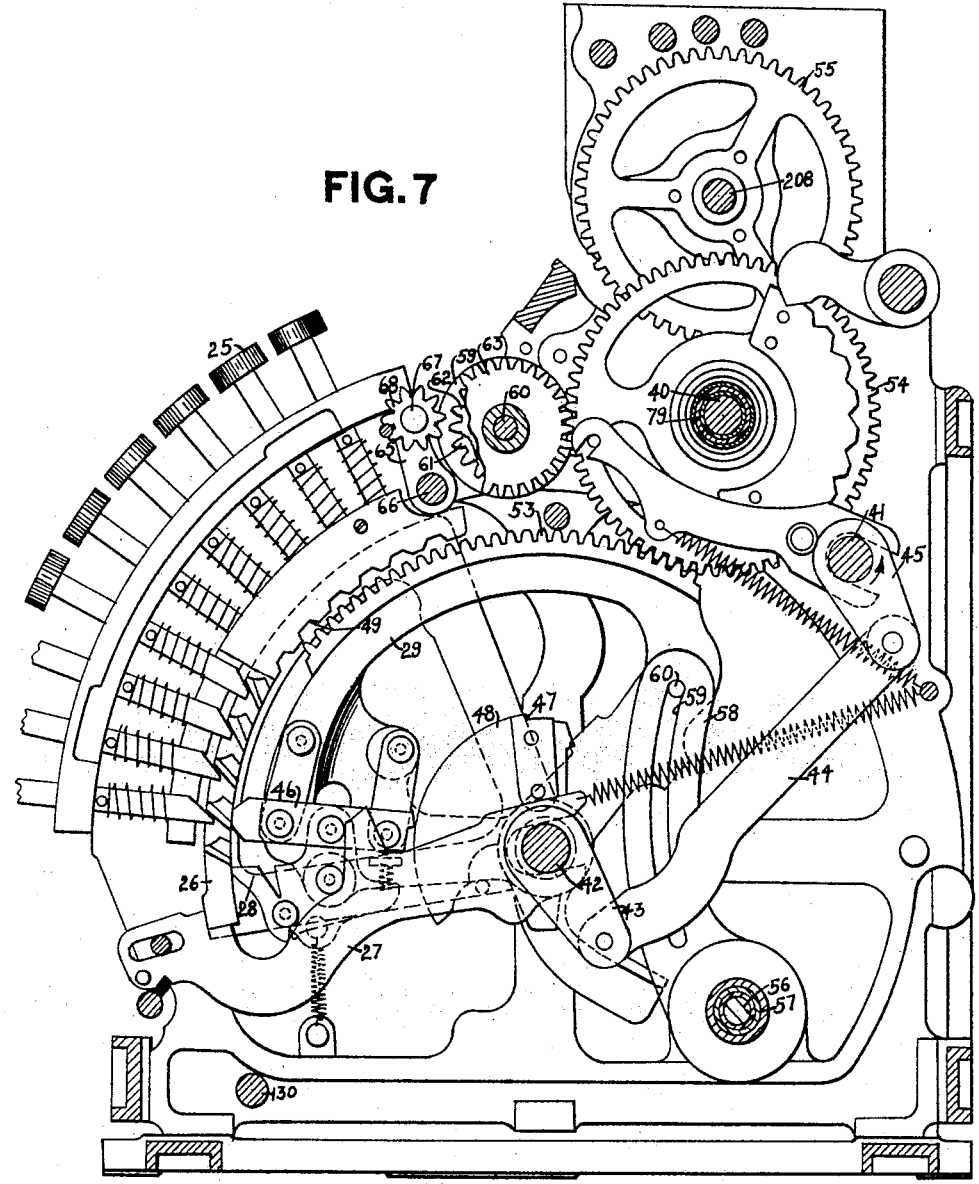

UNITED STATES PATENT OFFICE.

BERNIS M. SHIPLEY, OF DAYTON, OHIO, ASSIGNOR TO THE NATIONAL CASH REGISTER COMPANY, OF DAYTON, OHIO.

CASH-REGISTER.

1,398,576.      Specification of Letters Patent.     Patented Nov. 29, 1921.

Application filed December 19, 1919. Serial No. 346,133.

*To all whom it may concern:*

Be it known that I, BERNIS M. SHIPLEY, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash registers and has more particular relation to the type of cash registers shown and described in Letters Patent of the United States issued to Edward J. Von Pein, No. 938,527, on November 2, 1919, and No. 1,156,258, issued October 12, 1915.

The general operation and construction of the machine shown in the present application is substantially like that shown in the above mentioned Von Pein patents.

The purpose of the machine is to enable a merchant selling taxable goods to keep an account of the sale of all goods upon which there is placed a Government tax and also to keep an account of the proper tax which is collectible by the revenue department of the Government on the sale of such goods. In the accomplishment of this purpose, the machine is arranged so that the merchant or proprietor first sets up the amount of the purchase, then depresses a "tax" key and turns an operating handle whereby the amount of the purchase is registered and the proper amount of the tax is automatically computed based upon the amount of the purchase. Totalizers are provided for recording the amount of taxes and the amount of the purchase, one totalizer records all taxes, another totalizer records all "purchase" amounts, whether taxable or non-taxable and a third totalizer records all "purchase" amounts on the sale of non-taxable goods.

It is a further object of the machine to provide an indication to show when a tax is collected and when a tax is not collected.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings:—

Figure 1 is a side elevation and partly in section of the machine and illustrates particularly the "tax" totalizer and the "no-tax purchase" totalizer and the mechanisms associated therewith.

Fig. 2 is a detail view of the "tax" and "no tax" indicators, the frames of the machine being broken away.

Fig. 3 is a side elevation and partly in section of the machine illustrating a totalizer control mechanism and also shows the main driving mechanism of the machine.

Fig. 4 is a top plan view of the "tax" and the "no tax purchase" totalizers and illustrates a portion of the transfer mechanism therefor.

Figs. 5 and 6 illustrate the "tax" and "no tax" totalizer control keys.

Fig. 7 is a vertical sectional view through the machine illustrating an amount control bank, the "main purchase" totalizer, the differential actuating mechanism therefor and a part of the indicating mechanism.

Fig. 8 is a detail sectional view of the mechanism for holding the totalizers and their carrying plates in their normal position and also in their moved position, and also shows the means for rocking the tax totalizer to the reading position.

Fig. 9 is a detail sectional view of the mechanism for positioning the "no tax purchase" totalizer to receive an entry.

Fig. 10 is a detail sectional view of the transfer mechanism for the "tax" and "no tax purchase" totalizers.

The cash register to which this invention is here shown applied is substantially the same as that shown and described in the above mentioned Von Pein Patent No. 1,156,258.

Described in general terms, the machine herein comprises a keyboard controlling mechanism by which indicators are set to represent the different amounts, and by which totalizers are enabled to accumulate these amounts. One totalizer is provided in which all purchases are recorded. For convenience, this totalizer will be known as the "main purchase" totalizer. This totalizer has gear connections with the amount differential mechanism.

Two other totalizers mounted on an oscillatory frame are controlled by the "tax" and "no tax" keys, so as to position them for meshing with the differential mechanism, but the meshing occurs by a bodily reciprocation of the totalizer frame. One of these totalizers will be known herein as the "tax" totalizer and the other one as the "no tax purchase" totalizer.

When a taxable sale is to be recorded, the operator operates the amount keys and then the "tax" key and the amount is recorded upon the "main purchase" totalizer and the proper proportional tax amount is automatically recorded upon the "tax" totalizer.

When it is desired to enter a sale upon which no tax is to be assessed a "no tax" key is operated, whereby the "tax" totalizer is disabled, while the amount of the sale is recorded upon the "main purchase" totalizer and also upon the "no tax purchase" totalizer.

Proper indicating mechanism is provided for indicating the amount of each purchase. Indicating mechanism is also provided to indicate whether or not a tax is registered.

*Operating mechanism.*

The illustrative machine is, for the sake of simplicity, shown with only one amount bank and differential mechanism therefor, but as this machine is of a well known type, it is to be understood that any desired number of amount banks may be used, according to the capacity of the business in which the register is to be used.

Each of the banks has a vertical row of selectively depressible keys 25 (Fig. 7) ranging in value from "1" at the bottom to "9" at the top. These keys are held in depressed position when operated until the end of an operation of the main operating mechanism, to be later described, by a detent 26 and retaining bar 27, with one of the depressed keys projecting into the path of a trip 28 carried by an operating member 29.

An operating handle 30, (Fig. 3) is attached by a mortise and tenon to a pinion 31 mounted upon the side frame 32. The pinion 31 meshes with a large intermediate gear 36 mounted on a stud 37 carried by the frame 32. The intermediate gear in turn drives gears 38 and 39 fastened to shafts 40 and 41 respectively, which extend across the machine. This gearing above described is so proportioned that two complete rotations of the operating handle 30 will cause the shafts 40 and 41 to be given one complete rotation and in the direction as indicated by the arrows in Fig. 3.

*Differential mechanism.*

Running transversely through the machine is a rock shaft 42 (Figs. 1, 3 and 7). Attached to this rock shaft is an arm 43 connected by a link 44 to an arm 45 fast to the driving shaft 41. When the shaft 41 is rotated the arm 45 is carried with it, thereby through the link 44 and arm 43, rocking the shaft 42 through an arc of about 90°, first counter-clockwise and then in a clockwise direction (Fig. 7). During the counter-clockwise movement of the shaft 42, a plunger 46 engages a shoulder 47 on a plate 48 fast on the shaft 42 and through the connection so formed the operating member 29 is carried upward during the clockwise oscillation of the plate 48 until the trip 28, which eratively connected to the plunger 46, the rear end of the depressed key and the plunger 46 to be disengaged f shoulder 47, thereby disabling the co ction between the operating member 29 and the plate 48. As the plunger 46 is disengaged from the shoulder 47, it projects into one of the notches 49 corresponding to the depressed key so as to hold the operating member 29 in its adjusted postion.

The operating member 29 is formed with teeth 53 in mesh at all times with an intermediate gear 54. The differential adjustment of the operating member 29 is transmited through the gear 54 and pinion (not shown) to an indicator gear 55.

The indicators above mentioned are fully described and illustrated in Letters Patent of the United States issued to J. P. Cleal and F. A. Reinhard, No. 580,378, on April 13th, 1897, and for a detailed description of the indicators reference may be had to this patent.

Extending across the machine is a shaft 56 and a series of nested sleeves 57 concentric with and supported by said shaft. Attached to the shaft and to each of the sleeves is an arm 58 having a curved slot 59 coöperating with a stud 60 carried by the operating member 29. Through this connection the differential movement of the operating member 29 is transmitted to the shaft 56 and sleeves 57. Through this shaft and sleeves, the amount recorded by the keys 25 is transmitted to a printing mechanism which may be of the type illustrated and described in the above mentioned Von Pein Patent No. 1,156,258, but as the printing mechanism forms no part of the present invention, none has been shown herein.

*"Main purchase" totalizer.*

As above stated, the "main purchase" totalizer is arranged to accumulate therein all purchase amounts whether taxable or non-taxable. A totalizer of this type is fully illustrated and described in the above mentioned Von Pein Patent, No. 1,156,258, and also in the above mentioned Cleal and Reinhard patent. Therefore, but a brief description of this totalizer will be given here, as reference may be had to these just mentioned patents for a more detailed description of said totalizer. Described briefly, the totalizer comprises totalizer wheels 59 mounted upon a transverse shaft 60. Secured to the totalizer wheel 59 is a pinion 61. Coinciding with the pinion 61 is another pinion 62 which is secured to the side of a gear 63 that meshes with the intermediate gear 54. A frame 65 pivoted on a rod 66 carries a rod 67 on which are loosely mounted a number of broad pinions 68, each of which is of sufficient width to simultaneously mesh with the pinion 61 secured to the totalizer wheel 60 and the pinion 62 fast to the gear 63.

From the above description, it can be seen that the differential movement of the operating member 29 is transmitted through the gear 54 to the gear 63 and through the pinion 62 to the broad pinion 68 and from said pinion to the pinion 61 which is secured to the totalizer wheel 60.

Suitable means are provided for rocking the frame 65 so that the broad pinion 68 will be out of mesh with the pinion 61 and its coinciding pinion 62, in order that upon the return movement of the operating member 29 the amount which has been put upon the totalizer will not be taken therefrom. This means is old and well known in the art and is illustrated in the above mentioned Cleal and Reinhard patent and it is therefore thought that no description of it is necessary herein.

*"Tax" totalizer and "no tax purchase" totalizer.*

As hereinbefore stated, the machine is provided with two totalizers 70 and 71 (Figs. 1 and 4) mounted in an oscillatory frame. The left hand totalizer (Fig. 1) for convenience will be known as the "tax" totalizer, as there is automatically registered upon this totalizer the proper amount of tax which is to be assessed on every entry of purchase against which a tax is assessable. The right hand totalizer will be known as the "no tax purchase" totalizer, as it is upon this totalizer that the amount of all non-taxable purchases are registered.

Each of the totalizers 70 and 71 comprises a plurality of totalizer elements 75. The elements 75 are loosely mounted on shafts 72 carried by parallel plates 73 loosely mounted on a shaft 74, said shaft being carried by a reciprocating framework 69 (Fig. 4). This framework is substantially the same as that illustrated in the above mentioned Von Pein Patent No. 1,156,258, and reference to this patent may be had for a more detailed description and illustration thereof. In addition, the "tax" totalizer 70 has a single element 76 (Fig. 4) for a purpose to be hereinafter described. The totalizer elements 75, which are actuated directly from registering segments 78, comprise a numeral wheel bearing the digits "1" to "9" and "0" inclusive.

The registering segments 78 above mentioned are secured to nested tubes 79 (Figs. 1, 7 and 8) mounted on the shaft 40 and have secured at their other ends the gears 54 which, it will be remembered, are actuated by the operating members 29. Pinned to the totalizer element wheel is a transfer disk 80 carrying a single transfer tooth 81 for a purpose hereinafter described. The element 75 also carries a ratchet 82 adapted to coöperate with a spring pressed pawl 83 for the purpose of preventing retrograde movement of the element 75. The pawls 83 are loosely mounted upon rods 84 carried by the parallel plates 73 and are laterally spaced thereon by means of thin plates 85 curved around said rods. In addition, the units and tens of cents totalizer elements 75 and the dollars and tens of dollars totalizer elements 75 each carry an actuating pinion 86.

The element 76 of the "tax" totalizer is constructed slightly different from the totalizer elements 75 and constitutes an auxiliary actuator for the units of cents totalizer element 75 of the "tax" totalizer. The element 76 of the "tax" totalizer (Figs. 1 and 4) comprises a wheel which does not bear the digits as shown on the regular totalizer elements 75 but is perfectly blank. On the side of the element 76 of the "tax" totalizer is a transfer disk 90 which is provided with ten transfer teeth or projections 91. The element 76 is provided with a ratchet 92 similar to the ratchets 82 of the elements 75 and also coöperates with a spring pressed pawl 83 for the purpose of preventing retrograde movement of the element 76. The element also carries an actuating pinion 93 similar to the actuating pinions 86 of the totalizer elements 75. By referring to Fig. 4, it will be noted that the totalizer element 76 is in alinement with the units totalizer element 75 of the totalizer 71. The units totalizer 75 of the totalizer 71 is actuated, when rocked into position by means to be hereinafter described, by the actuating segment 78 (Fig. 1), which is secured to the sleeve 79 connected to the gear 54 operated by the units bank of keys 25.

When the totalizers are in the position as shown in Fig. 1, the pinion 93 of the totalizer element 76 is in alinement with the actuating segment 78 of the units gear 54 (Fig. 7) which is actuated by the units operating member 29 to actuate the units totalizer element 60 of the "main purchase" totalizer.

As previously stated, the positioning of the totalizers 70 and 71 for actuation is controlled by a control bank having two keys 100 and 101 (Fig. 3). The key 100 is designated "no tax" and the key 101 is designated "tax." The key 101 controls the positioning of the "tax" totalizer 70 while the key 100 disables the "tax" totalizer 70 and positions the "no tax purchase" totalizer for actuation. The key 100 is provided with a pin 102 which coöperates with a portion 103 of a member 104 bifurcated at 105 to surround the shaft 42. A slot 106 is also provided in the member 104 to coöperate with a pin 107 carried by a plate 108 secured to the frame 32. The plate 108 is provided with a slot 109 which coöperates with the pin 102 of the key 100 and acts as a guide for said key. Pivotally fastened to the member 104 at 110 is a link 111 the other end of which is pivotally mounted at 112 to a lever 113, loose on a horizontal rod 114. The key 101 is provided with a pin 118 which coöperates with a portion 119 of a member 120 bifurcated at 121 to surround the shaft 42. The member 120 is also provided with a slot 122 which coöperates with the pin 107. A slot 123 is provided in the plate 108 and coöperates with the pin 118 and acts as a guide for the key 101. Pivotally mounted upon the member 120 at 124 is a link 125, the rear end of which is pivoted at 126 to the lower end of the lever 113. The member 120 is provided with a slot 127 coöperating with a pin 128 carried by an arm 129 fast on a rock shaft 130 which extends horizontally through the machine. Secured to the shaft 130 is a plate 131 (Figs. 1 and 9) provided with an opening 132 which coöperates with a roller 133 carried by an arm 134 integral with an arm 135 mounted on a stud 136 carried by the side frame. Integral with the arm 135 is a Y-shaped arm 137 coöperating with a roller 138 carried by one of the plates 73. The arm 135 carries a roller 139 which coöperates with a cam arm 140, the purpose of which will be hereinafter described, secured to the rock shaft 42.

From the above description and with the parts standing in the position in which they are shown in Figs. 1 and 3, it can be readily seen that upon depression of the "tax" key 101, the pin 118 engages the portion 119 of the member 120 and moves said member rearward, thereby through the link 125 rocking the lever 113 in a clockwise direction. The rocking of the lever 113 through the link 111 causes the member 104 to be moved forward until the portion 103 thereof lies adjacent the pin 102 carried by the "no tax" key 100. The rearward movement of the member 120 through the slot 127 and pin 128 rocks the arm 129 and the shaft 130 in a counter-clockwise direction. The rocking of the shaft 130 causes the plate 131 (Figs. 1 and 9) to be rocked counter-clockwise, whereby the arm 135 actuated by the weight of its Y-shaped portion 137 will rock counter-clockwise. Should the arm 135 fail to rock under the weight of its Y-shaped arm 137, an edge 141 of the opening 132 in the plate 131 engages the roller 133 and thereby positively rocks the arm 135 in a counter-clockwise direction. The depression of the key 101 rocks a detent 145 (Fig. 3) similar to the detent 26 previously described, in a counter-clockwise direction a distance sufficient to allow a retaining bar 146, similar to the retaining bar 27 previously described, to be moved rearward under the action of a spring 147 so that a shoulder 148 on the retaining bar 146 will pass beneath a portion 149 on the detent 145 and thereby retain the detent in the elevated position and lock the key in the depressed position.

After the key 101 has been depressed and locked in the depressed position, as above described, the operating mechanism is operated by the handle 30 to rotate the shaft 41 and rock shaft 42 as previously described. The rocking of the shaft 42 causes the cam arm 140, previously mentioned, to be rocked in a clockwise direction (Figs. 1 and 9). The arm 135 having been rocked counter-clockwise by the depression of the key 101, so positions the roller 139 thereon that when the cam arm 140 is rocked clockwise, said roller will be engaged by the edge 150 of said arm. The edge 150 is concentric with the shaft 42, therefore, the engaging of this edge with the roller 139 simply locks the arm 135 and the mechanism connected thereto in the position to which it has been moved by the "tax" key 101 (Fig. 9). This will cause no rocking movement of the plates 73, therefore the "tax" totalizer 70 will remain in the position as shown in Fig. 1, so that when the reciprocating frame 69, to which the plates 73 are pivoted, is moved upward the "tax" totalizer 70 will be engaged with the actuating segments 78.

The means for moving the reciprocating frame 69 forms no part of this particular invention, therefore, it is not thought necessary to illustrate or describe this particular mechanism; for a description and illustration thereof, reference may be had to the above mentioned Von Pein Patent No. 1,156,258 this mechanism being shown in Fig. 6 thereof. At the completion of the operation of the operating mechanism, the rock shaft 42 is rocked counter-clockwise, thereby rocking the cam arm 140 to normal position to allow the totalizer to be rocked to normal position, as will be later described, and to allow either the "tax" key 101 or the "no tax" key 100 to be operated for a subsequent operation of the machine.

Should the sale of goods not involve a tax, the "no tax" key 100 is depressed, that is, after the proper amount of the sale has been set up by the operation of the amount keys 25. The depression of the "no tax" key 100 causes its pin 102 to engage the previously positioned portion 103 of the member 104 and move said member rearward to a position shown in Fig. 3. This will, through the link 111, rock the lever 113 counter-clockwise to the position illustrated in Fig. 3, and thereby move the link 125 forward and consequently the member 120 to the position in which these parts are shown in Fig. 3. When the member 120 is moved forward to this position, the plate 131, through the arm 129 and shaft 130, will be rocked clockwise thus restoring the arm 135 to the position shown in Fig. 1. The depression of the key 100 also moves the detent 145 and causes said detent to be locked by the retaining bar 146 in identically the same manner as when the key 101 is operated, as described above (Fig. 7). With the key 100 in the depressed position, an operation of the operating handle 30 will cause the rock shaft 42 to be rocked first clockwise, whereby an edge 151 of the cam arm 140 engages the roller 139 and rocks the arm 135 in a clockwise direction. The clockwise movement of the arm 135 causes its Y-shaped arm 137 to engage the roller 138, carried by one of the plates 73, thereby rocking both plates 73 in a counter-clockwise direction (Fig. 9) a distance sufficient to move the "no tax purchase" totalizer 71 to a position previously occupied by the "tax" totalizer 70 so that when the reciprocating frame 69 is moved upward, as previously stated, the "no tax purchase" totalizer 71 will be actuated by the actuating segments 78 to accumulate thereupon the amount of the "nontaxable" purchase.

As previously stated, the operator is compelled to depress either the "tax" or the "no tax" key before an operation of the machine can be accomplished. The means for compelling the operation of either one of the keys 100 or 101 to release the operating mechanism, comprises a stud 155 (Fig. 3) carried by the detent 145. The stud 155 coöperates with the forward end of a lever 156 fast on a horizontal shaft 157. The rear end of the lever is provided with a portion 158 that coöperates with a notch 159 formed in a disk 160 secured to the driving gear 38. From this description it can be seen that unless the portion 158 is moved out of engagement with the notch 159, that it is impossible to rotate the gear 38 through the operation of the operating handle 30. It can also be seen that upon the operation of either the "tax" key 101 or the "no tax" key 100, that as the detent 145 is rocked counter-clockwise, the pin 155, carried thereby, engages the forward end of the lever 156 and rocks said lever counter-clockwise, thereby disengaging the portion 158 thereof from the notch 159 in the disk 160, thus allowing the gear 38 to be rotated by an operation of the operating handle 30.

Means is provided for retaining the totalizers 70 and 71 and the totalizer plates 73 in their normal position and also in the moved position when the totalizer 71 is positioned for actuation. This means comprises an arm 165 (Figs. 1 and 8) loose on the shaft 74 and held in engagement with a square stud 166, carried by the plate 73, by means of a spring 167 stretched between said arm and an arm 168 also loose upon the shaft 74. The arm 168 carries a square stud which engages the arm 165. A spring 164 stretched between the arm 168 and a stud carried by the plate 73 holds the arm 168 in the normal position and also through the square stud 169 helps to retain the arm 165 in engagement with the stud 166. Pivoted to the arm 165 is an arm 170 held in engagement with a pin 171 by means of a spring 172 stretched between the arm 170 and a pin carried by the plates 73.

Pivotally mounted to the arm 168 at 175, is a link 176, the other end of which is pivoted to an arm 177, the lower end of which is loosely mounted upon the shaft 42 (Fig. 8). Pivoted to the arm 177 at 179 is a lever 180 carrying a square stud 181 coöperating with a notch 182 formed in a plate 183 secured to the machine side frame.

When the plates 73 are rocked counter-clockwise to position the "no tax purchase" totalizer, the arms 168 and 165 are maintained in their normal position by means of the link 176, arm 177, lever 180 and the square stud 181 carried thereby, and thus putting an extra tension upon the spring 164. The plates 73 are rocked until a square stud 178 carried by one of said plates engages the lower edge of the arm 165, said arm acting as a stop for the plates 73. During the rocking of the plates 73, the arm 170 is rocked counter-clockwise by means of pin 171, thereby disengaging its hook from the pin 171, the rear edge of said arm being held in engagement with said pin by means of the spring 172.

After the plates 73 have been rocked to position as just described and after the positioned totalizer has been moved into and out of engagement with the actuating segments 78, the plates are rocked clockwise to normal position under the influence of the spring 164, which it will be remembered was put under extra tension by the rocking of the plates 73 in a counter-clockwise direction.

*Transfer mechanism and auxiliary actuator of "tax" totalizer.*

The totalizers and the mechanism controlling the positioning of the same having been described, the mechanism for performing the transferring from a lower order to a higher order will now be described and the mechanism whereby a proportionate amount is to be accumulated upon the "tax" totalizer and also the mechanism for accomplishing this proportionate accumulation and the regular amount which is accumulated upon the "Main Purchase" totalizer.

The transfer mechanism for transferring from the units of cents to the tens of cents totalizer elements 75 of the "tax" totalizer, comprises an arm 184 (Figs. 1 and 10) loose on a rod 185 mounted in the side frames of the machine. The arm 184 carries an anti-friction roller 186 coöperating with a cam race 187 formed in the side of a cam 188 fast upon the drive shaft 41. Pivotally mounted to the upper end of the arm 184 is the rear end of a link 189, the forward end of which is provided with an L shaped slot 190 for surrounding a grooved shaft 191 mounted in the side frames of the machine. Pivoted to the link 189 at 192 is a transfer pawl 193 having integral therewith a formed portion 194 which lies in the plane of the ratchet 82, secured to the tens of cents totalizer elements 75. This pawl 193 is held in its normal position by means of a trip pawl 195 pivoted at 196 to the link 189. The pawl 195 has an upwardly extending portion 197 that engages a shoulder 198 on the pawl 193. A spring 199 stretched between the transfer pawl 193 and the trip pawl 195, holds them in the normal position as shown in Figs. 1 and 10. The trip pawl 195 lies in the same plane with the transfer disk 80 of the units of cents totalizer elements 75.

Upon the rotation of the shaft 41, the cam race 187, through the roller 186, causes the arm 184 to be rocked in a clockwise direction, thereby moving the link 189 forward until the slot 190 engages a rod 200, carried by parallel arms 201 (only one of which is shown) fast upon the shaft 191. Also fast to the shaft 191 is an upwardly extending arm 202, having pivotally mounted thereto the forward end of a link 203, which carries two rollers 204 that coöperate with a plate cam 205 secured to the shaft 40.

After the link 189 has been moved forward as above described, the cam 205 causes the link 203 to be moved rearward in the direction of its length thereby rocking the arm 202, the shaft 191 and consequently the arms 201 in a counter-clockwise direction (Fig. 10). The rocking of the arms 201 raises the rod 200 and thereby the link 189 so that the shaft 191 will engage in the lower end of the vertical portion of the L shaped slot 190, thus raising the transfer pawl 194 so that when the totalizer 70 or 71, whichever the case may be, is moved upward to engage the actuating segment 78, said transfer pawl 193 will not interfere with the actuation of the totalizer by the actuating segments 78.

While the totalizer gear 86 is in engagement with the actuating segment 78 and as said gear is being moved by said segment, when the units of cents totalizer elements pass from "9" to "0" the transfer tooth 81 of the units of cents totalizer elements engages the trip pawl 195 and rocks said trip pawl clockwise disengaging its portion 197 from the shoulder 198, integral with the transfer pawl 193, thereby allowing said transfer pawl 193 to be rocked counter-clockwise under the influence of the spring 199. After the cam 205 has caused the link 189 to be lowered so that the shaft 191 engages the upper part of the vertical portion of the L shaped slot, the link 189 is moved rearward to normal position by the cam race 187, whereby the portion 194 of the transfer pawl 193 engages the ratchet 82 secured to the tens of cents totalizer element 75 and moves said element one space, or in other words, adds one to this element. The transfer mechanism for transferring from the tens of cents to the units of dollars and from the units of dollars to the tens of dollars, is identically like the transfer mechanism just described in connection with the units of cents totalizer element. The transfer between these elements just described takes place only as one element makes a complete revolution, or in other words, passes from "9" to "0".

The transfer mechanism from the auxiliary totalizer element 76 to the units of cents totalizer element, is substantially the same as that just described in connection with the higher order totalizer elements except that as before stated the transfer disk 90 of the auxiliary totalizer element 76 is provided with 10 transfer teeth 91. As a result of this construction the appropriate pawl 195 will be tripped every time the auxiliary totalizer element 76 is given a movement regardless of the extent of that movement. By way of example let it be assumed that an amount of 9 cents is set upon the amount keyboard by the depression of the "9" key 25 and that the "tax" key 101 has been depressed, which signified that the article sold for 9 cents is assessable to a Government tax. Upon operation of the operating handle 30 the operating member 29 will be positioned so that the intermediate gear 54 (Fig. 7) will be rotated a distance sufficient to add "9" to the units of cents totalizer wheel 59 of the "main purchase" totalizer. Through the movement of the intermediate gear 54 and by means of the sleeve 79 secured thereto, the actuating segment 78 (Fig. 1) is moved a distance sufficient to ordinarily add "9" upon the units totalizer element, but since this segment coöperates with the auxiliary totalizer element 76, it will rotate this element, thereby causing the transfer disk 90 of this element to engage the trip pawl 195 and trip said pawl thereby allowing the transfer pawl 193, which coöperates with the units of cents ratchet 86, to be rocked into position to move said ratchet one step and consequently the units of cents totalizer 75 or in other words, add one to the units of cents totalizer element.

For another example suppose that the amount of sale on a taxable article was 25 cents. The tax on the amount is 3 cents. Upon operation of the machine the amount 25 cents will be accumulated in the "main purchase" totalizer. The actuating segment 78 connected to the units of cents actuator for the "main purchase" totalizer will operate the auxiliary actuator or totalizer element 76 and the actuating segment 78 connected to the tens of cents actuator for the "main purchase" totalizer operates the units of cents totalizer element 75 of the "tax" totalizer. As the amount of this sale was 25 cents the actuating segments 78 connected to the tens of cents actuator for the "main purchase" totalizer will add "2" upon the units of cents totalizer element 75 of the "tax" totalizer. The actuating segment 78 connected to the units of cents actuator for the "main purchase" totalizer operates the auxiliary actuator 76 of the "tax" totalizer thereby causing its transfer disk 90 to trip the pawl 195 appropriate thereto thereby causing the transfer pawl 194, released by the tripping of the pawl 195, to actuate the units of cents totalizer element 75 and add one more upon said totalizer element, thus registering the proper amount of tax in proportion to the amount of the purchase, which in this case is 3 cents.

From this description, it will be clear that when a taxable amount of "9 cents" is registered on the machine, said amount will be added upon the "main purchase" totalizer and the proper proportion of said amount representing "tax," which in this case is "1 cent," will be automatically added upon the "tax" totalizer. The amount of tax being 1 cent for every 10 cents or fraction thereof. It will also be clear from the second illustration given that when "25 cents" is registered upon the machine, said amount will be added upon the "main purchase" totalizer and also the proper "tax," which in this case amounts to "3 cents," will be automatically added upon the "tax" totalizer.

In so far as the regular transfer from a totalizer element of lower order to a totalizer element of higher order is concerned, it forms no part of the present invention as the mechanism is old and well known in the art and is fully shown and described in the aforesaid Von Pein Patent No. 938,527. The use of the auxiliary actuating element 76 in a mechanism similar to the transfer mechanism for giving the additional step of movement to the penny wheel of the "tax" totalizer is new in the present application and it is by the employment of this mechanism that the automatic registration of a tax equal to 1 cent for each 10 cent purchase or fraction thereof is made possible.

*"Tax" and "no tax" indication.*

In order to indicate publicly whether or not a tax has been registered, an indicating mechanism is provided comprising the following construction. Loosely mounted upon a shaft 208 (Figs. 1 and 2) are two drums 209 and 210 each carrying special indicia. This indicia is identical with that upon the "tax" and "no tax" keys as illustrated in Figs. 5 and 6. Secured to the drums 209 and 210 are gears 211 meshing with pinions 212 fast on a shaft 213 carried by the side frames of the machine. Also fast on the shaft 213 is a pinion 214 (Fig. 3) meshing with a gear 215 loose on the shaft 208. Secured to the gear 215 is a similar gear 216 meshing with a gear 217 loose on the shaft 40.

Meshing with the gear 217 is a member carrying latch mechanism and controlled by the depression of the "tax" and "no tax" keys 101 and 100 respectively, but as this member and its latch mechanism is exactly similar to the member 29 and its latch mechanism shown in Fig. 7 and associated with the amount banks, and has been omitted from Fig. 3 for the sake of clearness in this figure.

The indicia on the drums 209 and 210 is so positioned that when, for example, the "no tax" key (Fig. 3) is depressed that through the above mentioned operating member which is like the one numbered 29 in Fig. 7, the gear 217 will be rotated thereby operating the gears 216 and 215 and the pinion 214 and consequently the pinions 212 thereby rotating the drums 209 and 210 to position the "no tax" indicia so that it will assume the position now occupied by the "tax" indicia illustrated in Fig. 2, the drum 209 indicating to the back of the machine and the drum 210 indicating to the front of the machine. If the "tax" key 101 is operated in the subsequent operation of the machine from that just described, the indicators 209 and 210 will be moved back to the position which they assume in Fig. 2.

*Means for moving tax totalizer to reading position.*

Means is provided for manually rocking the plates 73 in a clockwise direction to move the "tax" totalizer 70 to the position occupied by the "no tax" totalizer as shown in Fig. 1 in order that the amount of the taxes which have been accumulated upon the said "tax" totalizer may be read by a government official when he comes to collect the tax from the merchant or proprietor.

This means comprises a lever 220 (Figs. 1 and 8) normally locked under a cover 221 secured to the cabinet in which the machine may be inclosed. The lever 220 is shown in the inoperative position. After the cover 221 has been unlocked and raised around its hinge point 222, the lever 220 may be moved to a nearly upright position. The lever 220 is pivotally and slidably mounted at 223 to the lever 180 previously described. After the lever 220 is raised to a nearly upright position it may be moved downward, thus engaging a groove 224 therein, with a square stud 225 carried by the lever 180.

Secured to a short horizontal shaft 226 is an arm 227 connected by a pin and slot connection to the upper arm of a bell crank 228 pivotally mounted at 229 to the side frame of the machine. Pivoted to the arms 227 and 228 at 230 and 231, respectively, is a curved plate 232.

With the handle 220 in the upright position and with its groove 224 engaging the stud 225, said handle may be pushed in thereby rocking the lever 180 in a clockwise direction around its pivot 179 and disengaging the square stud 181 from the notch 182 in the plate 183. As the stud 181 is disengaged from the notch 182, said stud engages the curved plate 232 and forces said plate inward toward the shaft 42 thereby rocking the arm 227 in a clockwise direction and the bell crank 228 in a counter clockwise direction. After the plate 232 has been moved inward, the lever 220 may be drawn downward (as viewed in Fig. 1) whereby the stud 181 will be positioned between said curved plate 232 and the inward edge of the plate 183 thus preventing the arm 227 and the bell crank 228 from being moved back to the normal position. As the lever 220 is moved downward the arm 177 is rocked in a clockwise direction about the shaft 42 (counter clockwise in Fig. 8). From the previous description it will be remembered that the link 176 is mounted to the arm 177 at one end and to the arm 168 at the other end. Therefore when the arm 177 is rocked clockwise the plates 73, through the link 176 and the arm 168, will be rocked in a clockwise direction thus moving the "tax" totalizer 70 to a position previously occupied by the "no tax" purchase totalizer 71 so that the amount on said totalizer may be read.

It is desirable to lock the machine against operation when a reading is being taken from the "tax" totalizer. Means is provided for accomplishing this locking and comprises an arm 235 secured to the shaft 226. The arm 235 is provided with an upwardly extending portion 236 which coöperates with a notch 237 formed in a disk 238 secured to the driving shaft 41. When the shaft 226 is rocked by the depression of the lever 220, as described above, the arm 235 is rocked in a clockwise direction so that its portion 236 engages the notch 237 thereby preventing rotation of the disk 238 and consequently the operating shaft 41 to which it is secured.

Means is also provided for preventing a depression of either the "tax" or "no tax" key when the totalizer frame 73 is rocked clockwise to take a reading from the "tax" totalizer. This means comprises a pin 239 carried by the lower arm of the bell crank 228. When the bell crank 228 is rocked counter-clockwise by the depression of the lever 220, the pin 239 engages a portion 240 of the plate 131 (Figs. 1 and 9) rocking said plate counter-clockwise until said pin engages a notch 241 in the plate 131 thereby preventing the plate from being rocked either in the clockwise or counter-clockwise direction should any one try to depress either the "tax" or "no tax" key.

*Operation.*

An operation of the machine will now be described. For example let it be assumed that the proprietor has sold a taxable article for 75 cents. The tax upon this amount according to the basis of 1 cent tax for each 10 cents or fraction thereof is 8 cents. The proprietor first depresses the amount keys 25 (Fig. 7) to set 75 cents and then depresses the "tax" key 101 (Fig. 3). Upon depression of the "tax" key the pin 118 thereon moves the member 120 rearward and through the links 125 and 111 and the lever 113 moves the member 104 forward thus preventing a depression of the "no tax" key 100. The movement of the member 120 through the arm 129 and shaft 130 rocks the plate 131 counter-clockwise thereby allowing the arm 135 to rock counter-clockwise which positions the roller 139 carried thereby beneath the edge 150 of the cam arm 140 secured to the rocking shaft 42.

The "tax" key 101 is locked in a depressed position by means of the retaining bar 146 which engages the shoulder 149 of the detent 145 moved by the depression of said key. The pin 155 carried by the detent 145 rocks the lever 156 counter-clockwise thereby disengaging its portion 158 from the notch 159 in the disk 160 secured to the driving shaft 40.

The operating handle is now given two complete revolutions in the counter clockwise direction and through the pinion 31 and gears 36, 38 and 39 rotates the shaft 40 counter clockwise and rotates the shaft 41 clockwise (Fig. 3).

The rotation of the shaft 41, through the arms 43 and 45 and the link 44, causes the shaft 42 to be rocked first counter clockwise and then clockwise as viewed in Fig. 7. The counter clockwise movement of the shaft causes plate 48 secured thereto to engage the plunger 46 and as the shaft 42 and plate 48 are rocked in a clockwise direction the plunger 46 and the operating member 29 are carried upward or rocked in a clockwise direction until the trip 28 strikes the end of the depressed key, thereby releasing the plunger from the plate 48 which causes the operating member to stop in the adjusted position.

The operating member 29 through the intermediate gears 54 causes the amount, which was set up by the depression of the keys, to be accumulated on the "main purchase" totalizer elements 59. The amount thus accumulated is indicated upon the amount indicating elements 55.

The operating element associated with the "tax" and "no tax" keys is driven by a plate similar to the plate 48 and positions the indicator drums 209 and 210, through the gears 217, 216 and 215, to indicate "tax". The movement of the shaft 42, (Fig. 1) causes the cam arm 140 to be rocked first clockwise so that its edge 150 will engage the roller 139 and hold said roller and the arm 135 in the position to which it was moved by the depression of the "tax" key thus preventing any movement of the plates 73. Therefore the "tax" totalizer 70 will remain in the position in which it is shown in Fig. 1 to receive actuation after it is moved into engagement with the segment 78.

The actuating segments 78 connected to the intermediate gears 54 associated with the units of cents and tens of cents bank will operate the "units of cents" totalizer element 75 of the "tax" totalizer and also the auxiliary actuator 76 of the "tax" totalizer thereby causing 8 cents to be added upon the units of cents totalizer element 75 of the "tax" totalizer through the operation of the transfer mechanism hereinbefore described.

After the totalizers have been actuated the parts are all returned to home position during the latter part of the revolution of the shafts 40 and 41.

While the form of mechanism herein shown and described is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is:—

1. In a machine of the class described, the combination of three totalizers, actuating means for one totalizer, actuating means common to the other two totalizers and operated by the first mentioned means, an auxiliary actuator for one of the last two totalizers and operated by the last mentioned means for adding upon said totalizer an amount different from the amount determined by said last mentioned means, and means for moving the other of the last two totalizers out of operative relation with any of the actuators.

2. In a machine of the class described, the combination of three totalizers, actuating means common to all totalizers, said totalizers simultaneously actuated in combination of twos, one combination when actuated adapted to receive like amounts from said actuating means, and a second combination when actuated adapted to receive unlike amounts from the same actuating means.

3. In a machine of the class described, the combination of three totalizers, actuating means common to all totalizers, said totalizers simultaneously actuated in combination of twos, one combination when actuated adapted to receive like amounts from said actuating means, and a second combination when actuated adapted to receive unlike amounts from the same actuating means, and means for selecting the combination of totalizers to be operated.

4. In a machine of the class described, the combination of three totalizers, actuating means common to all totalizers, said totalizers simultaneously actuated in combination of twos, one combination when actuated adapted to receive like amounts from said actuating means, and a second combination when actuated adapted to receive unlike amounts from the same actuating means and key actuated means for selecting the combination of totalizers to be operated and rendering the other combination inoperative.

5. In a machine of the class described, the combination of two totalizers, normally positioned for simultaneous actuation, actuating means common thereto, and auxiliary actuator interposed between one of said totalizers and said actuating means for causing said totalizers to have added thereupon unlike amounts from the single amount upon said actuating means, a third totalizer, means for disabling one of the first two totalizers and engaging the third totalizer with the actuating means so that like amounts may be added upon said third totalizer and the totalizer of the first two which was not disabled.

6. In a machine of the class described, the combination of two totalizers, normally positioned for simultaneous actuation, actuating means common thereto, an auxiliary actuator interposed between one of said totalizers and said actuating means for causing said totalizers to have added thereupon unlike amounts from the single amount upon said actuating means, a third totalizer, means for disabling one of the first two totalizers and engaging the third totalizer with the actuating means so that like amounts may be added upon said third totalizer and the totalizer of the first two which was not disabled, said last mentioned means being key operated.

7. In a machine of the class described, the combination of three totalizers, actuators for one of said totalizers, actuators common to the other two totalizers, an auxiliary actuator for one of the last two mentioned totalizers operated by the lowest denomination of the common actuators, means controlled by the auxiliary actuator for adding an amount on its respective totalizer different from the amount determined by the common actuator, and means for moving the other of the last two mentioned totalizers out of operative relation with the common actuator.

8. In a machine of the class described, the combination of a main operating mechanism, three totalizers, actuators for one of said totalizers, actuators common to the other two totalizers, an auxiliary actuator for one of the last two mentioned totalizers and operated by the lowest denomination of the common actuator, means operated by the main operating mechanism and controlled by the auxiliary actuator for adding an amount upon one of the said last two totalizers different from the amount determined by the common actuator, and means for moving the other of the last two mentioned totalizers out of operative relation with the common actuator.

9. In a machine of the class described, the combination of manipulative amount determining devices, three totalizers, actuating means for one totalizer, actuating means common to the other two totalizers and operated by the first mentioned means, both of said means being controlled by said devices, an auxiliary actuator for one of said two totalizers and operated by the last mentioned means for adding upon one of said last mentioned totalizers an amount different from the amount determined by the manipulative devices, and manually controlled means whereby the first one totalizer mentioned and only one of the other two totalizers are operated during one operation of the machine.

10. In a machine of the class described, the combination of a main operating mechanism, a totalizer, actuating means therefor, two totalizers, actuating means common to said two totalizers, an auxiliary actuator for one of said two totalizers and operated by said common actuating means, means operated by the main operating mechanism and controlled by the auxiliary actuator whereby an amount different from the amount added upon the first mentioned totalizer is added upon one of said two totalizers, a rock frame carrying the two totalizers and adapted to be rocked so that either one of the totalizers may be brought into operative position with the common actuating means.

11. In a machine of the class described, the combination of a main operating mechanism, a totalizer, actuators therefor, another totalizer, actuators therefor and controlled by the first mentioned actuators, an auxiliary actuator for one of the totalizers and operated by the lowest denomination of the last mentioned actuators, and means operated by the main operating mechanism and controlled by the auxiliary actuator for adding an amount on the second totalizer different from the amount on the other of said totalizers.

In testimony whereof I affix my signature.

BERNIS M. SHIPLEY.